Figure 1:
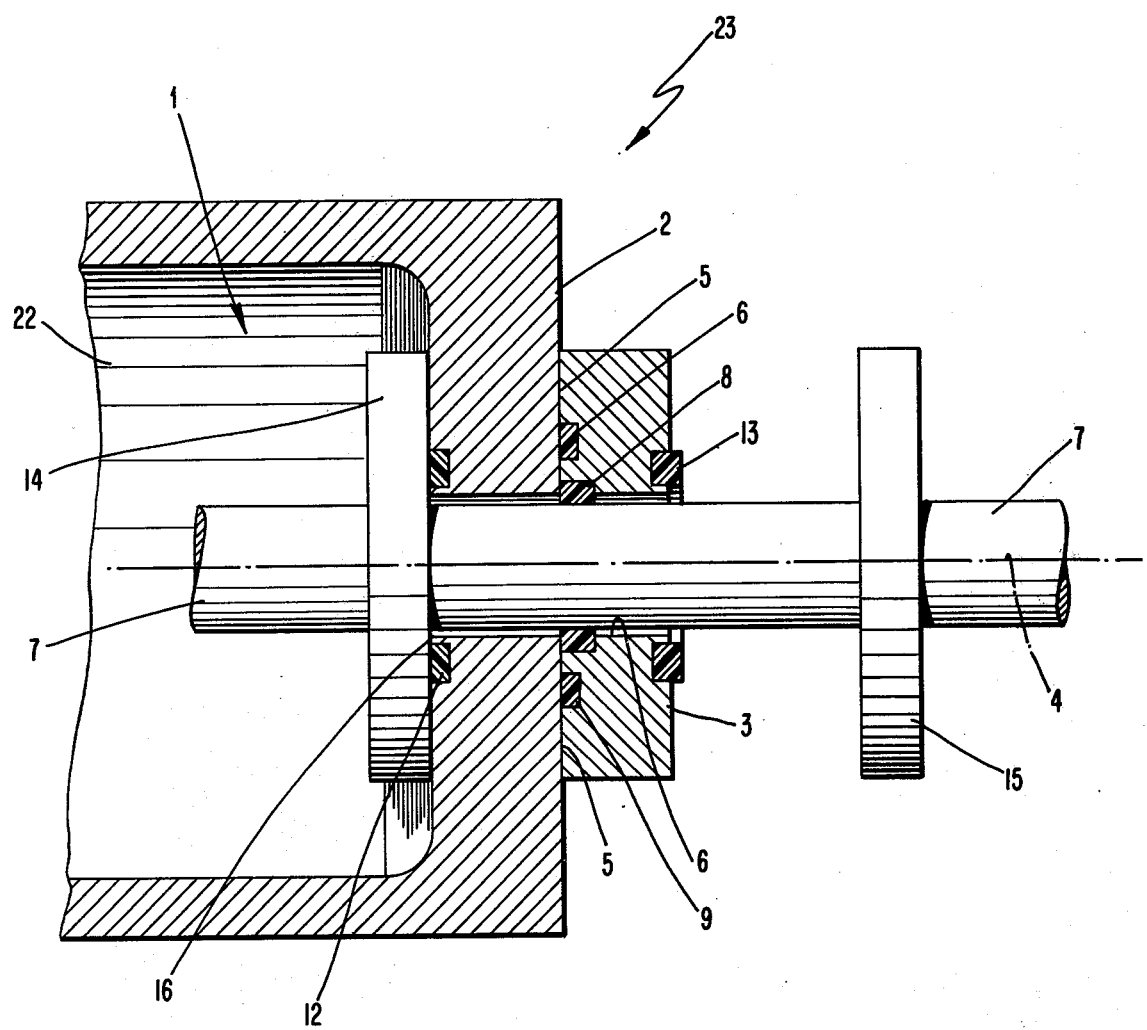

United States Patent [19]

Nowack et al.

[11] 4,161,316
[45] Jul. 17, 1979

[54] GASTIGHT PENETRATION

[75] Inventors: Helmut Nowack, Fislisbach; Adelbert Rappange, Kleindöttingen, both of Switzerland

[73] Assignee: BBC Brown, Boveri & Company Limited, Baden, Switzerland

[21] Appl. No.: 833,361

[22] Filed: Sep. 14, 1977

[30] Foreign Application Priority Data

Aug. 18, 1977 [CH] Switzerland ............... 10142/77

[51] Int. Cl.² .............................................. F16J 15/06
[52] U.S. Cl. ...................................................... 277/9
[58] Field of Search ................................ 277/1, 9, 9.5

[56] References Cited

U.S. PATENT DOCUMENTS

| | | | |
|---|---|---|---|
| 3,604,098 | 9/1971 | Goldberg | 277/9 |
| 3,675,933 | 7/1972 | Nappe | 277/9 |
| 3,778,881 | 12/1973 | Knapp | 277/9 |

*Primary Examiner*—Robert I. Smith
*Attorney, Agent, or Firm*—Burns, Doane, Swecker & Mathis

[57] ABSTRACT

A gastight seal arrangement for an actuating rod that passes through a wall of a gas-filled enclosure is described. The actuating rod includes a pair of flanges that are spaced longitudinally of the rod and are positioned on opposite sides of the wall of the enclosure. Impact seals on the interior and exterior of the wall surround the actuating rod and are engaged by the respective flanges corresponding to the position of the rod. Additional seal members are provided in the interior of the wall to prevent leakage along the surface of the actuating rod.

6 Claims, 5 Drawing Figures

GASTIGHT PENETRATION

The invention concerns a gastight penetration through a wall of a gas-filled enclosure, in particular of an electrical switching device, for an actuating rod able to move in the axial direction and supported in at least one sliding guide.

The aim of the invention is above all to improve greatly the reliability of such a gastight penetration, while at the same time appreciably simplifying maintenance of the penetration, should this be necessary.

A gastight penetration for a rod able to move relative to the wall of a gas-filled container for electrical switching devices operating with compressed gas is known from DT-AS 23 15 732. This penetration incorporates two rigid rings surrounding the rod, each having one sliding bearing or sliding guide and each with at least two elastic sealing rings, the rigid rings being located in the axial direction so that they form a cavity round the rod to accommodate a filling of grease. Under certain circumstances this penetration also requires two flanged discs which each by way of an interposed sealing element are pressed against the wall of the gas-filled container. Hence, with this penetration at least four elastic sealing rings are needed which, since they are of the same kind, are liable to experience the same kind of defect and can therefore fail simultaneously and unpredictably. Furthermore, the use of a grease filling, i.e., grease lubrication of the penetration or sliding bearings and also of the sealing rings presents serious problems as these parts are exposed to the action of the gas, in particular sulphur hexafluoride, the primary and secondary decomposition products of which destroy the grease. In addition, of the two sealing rings subject to the most wear, only the sealing ring situated closer to the grease filling can be changed while maintaining the pressure in the compressed-gas space. Finally, the sealing elements between the flanged discs and the wall do not contribute towards sealing the gap between wall and rod.

The object of the invention is therefore to increase the gas-tightness of penetrations according to the invention with a view to improving the reliability of gastight penetrations, and at the same time to enable at least the two most severely loaded seals to be replaced very easily.

This object is achieved in that the penetration, divided perpendicularly to the axial direction into at least two parts, i.e., a sealing housing or a wall of the gas-filled enclosure and also a sealing flange, incorporates in the region of division at least one sliding seal which acts predominantly radially and seals in a gastight manner the gap between the sealing housing or wall and the sealing flange, on the one hand, and the actuating rod on the other hand, there being in addition at least one flange seal acting predominantly axially between the sealing housing or wall and the sealing flange and surrounding the sliding seal in the region of division, and in that at each of the two end faces of the penetration at least one first impact seal acting predominantly axially is located at the sealing housing or wall by means of a first seal retainer and at least one second impact seal acting predominantly axially is located at the sealing flange by means of a second seal retainer, and in that when the rod is in one extreme position the gap in the region of one end is also sealed in gastight manner through the combined action of the first impact seal with a first rod-sealing flange located on the actuating rod, and when the rod is in the other extreme position the gap in the region of the other end is sealed through the combined action of the second impact seal with a second rod-sealing flange located on the actuating rod.

In a preferred alternative form, a sliding guide is located in the sealing housing or wall for the actuating rod and a rubbing strip is provided between the sliding guide and the first impact seal, particularly to intercept dust from the gas space.

It is of particular advantage to fasten the sealing flange and the second seal retainer detachably to the sealing housing or wall of the gas-filled enclosure by means of screws, axially clamping the sliding seal, the flange seal and the second impact seal.

It is also of advantage to fasten the first seal retainer detachably to the sealing housing or wall of the gas-filled enclosure by means of other screws, axially clamping the first impact seal.

In another alternative form it is recommended that on the side of the first rod-sealing flange facing the first impact seal and also on the side of the second rod-sealing flange facing the second impact seal there should be provided a first and second seal profile, respectively, each pressing on its corresponding impact seal when the actuating rod is in the appropriate extreme position.

It is further of benefit if the sliding seal is in the form of an essentially V-shaped double-lip seal acting predominantly in the radial direction, the two lips being located in the sealing housing.

It is also an advantage if another rubbing strip is provided between the sliding seal and the second impact seal in the sealing flange.

The advantages of the invention consist particularly in the fact that the penetration remains virtually leak-free for years, even under extreme temperature conditions, and any loss of gas that does occur from the gas-filled enclosure is not more than a few grammes per year. The gastight penetration of the invention is functionally very efficient, and hence highly reliable. This is achieved through the use of two sealing principles which act completely independently of each other, namely by means of not less than one sliding seal that permanently acts at least radially and at each of the two extreme positions of the actuating rod is aided by not less than one impact seal acting at least axially. Despite the improvement in tightness and reliability of the gastight penetration achieved by virtue of its design, a feature of the penetration is the simplicity of its construction and the consequent ease of maintenance which in particular makes it possible, if at all necessary, to replace all the severely stressed seals, such as the sliding seal and the second impact seal, very easily and with a minimum of time and effort. This aspect is considered in more detail below in the description of an example.

Figure 2:
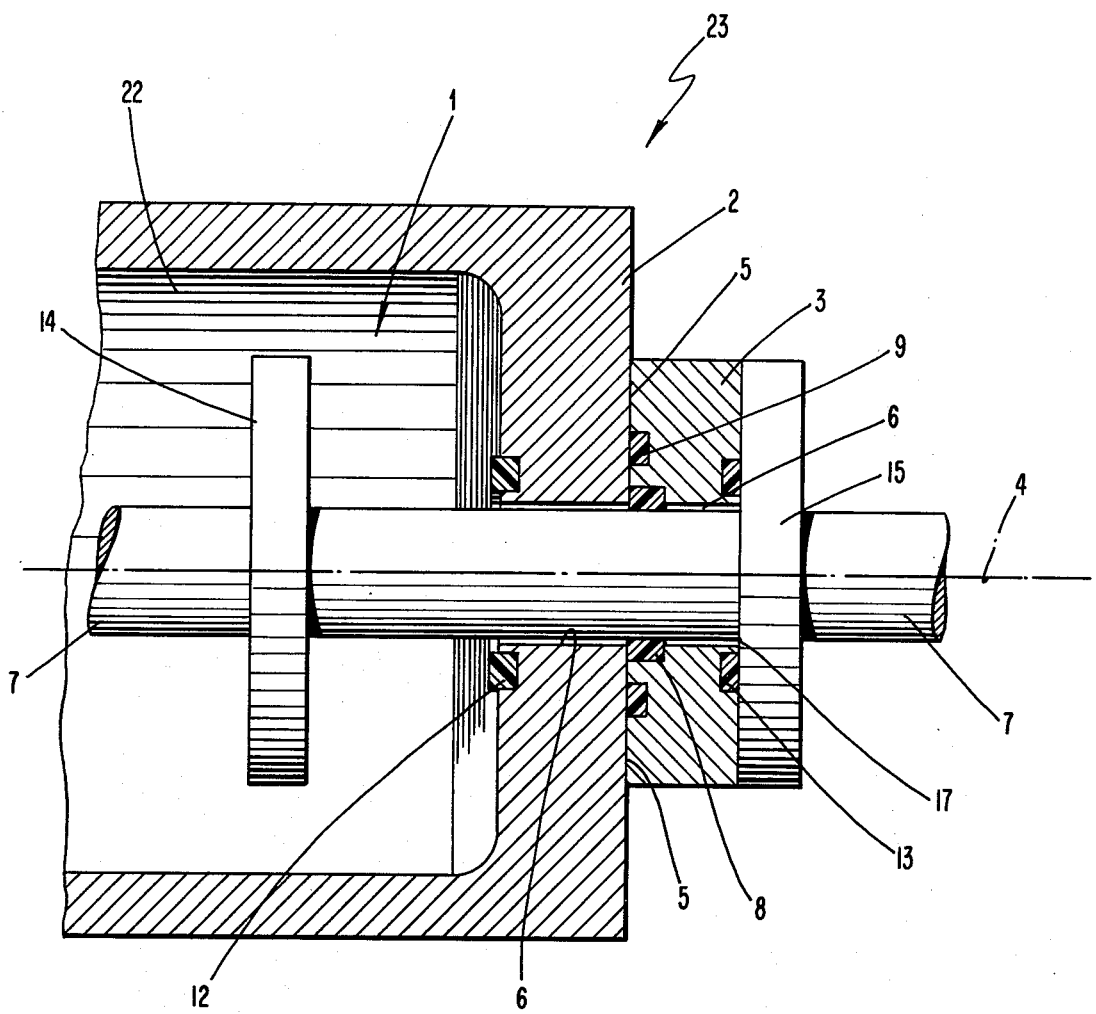
Figure 3:
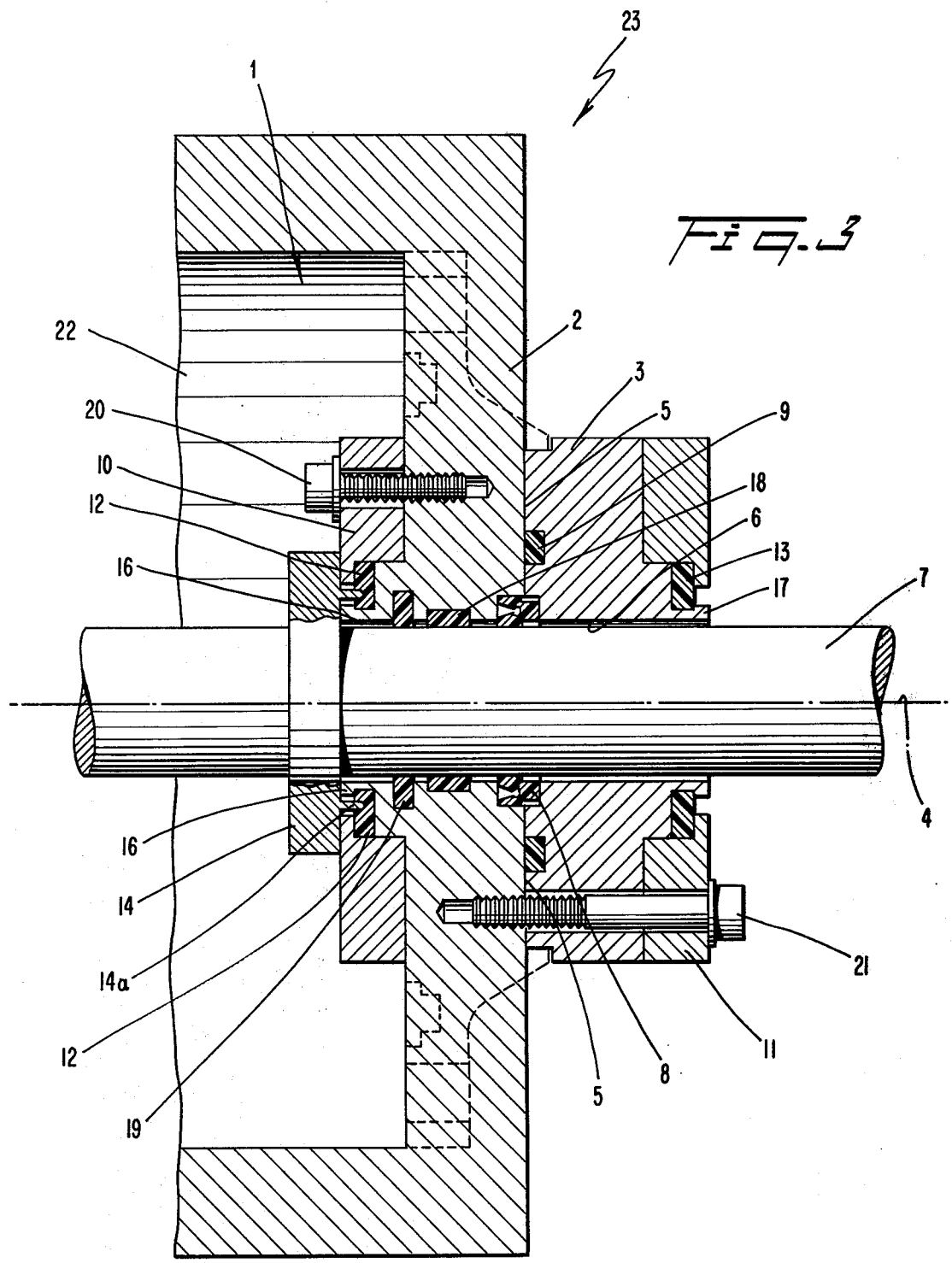
Figure 4:
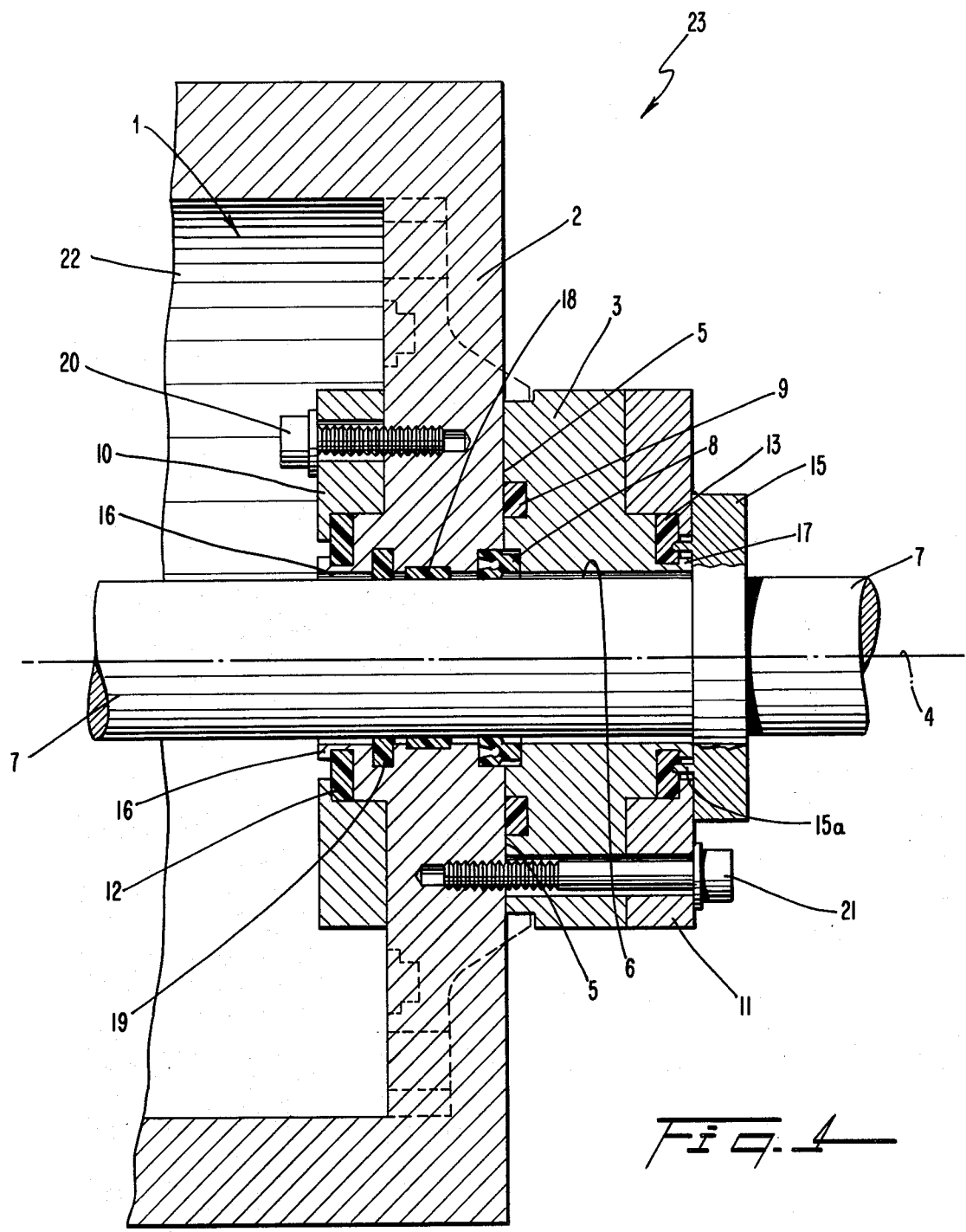
Figure 5:
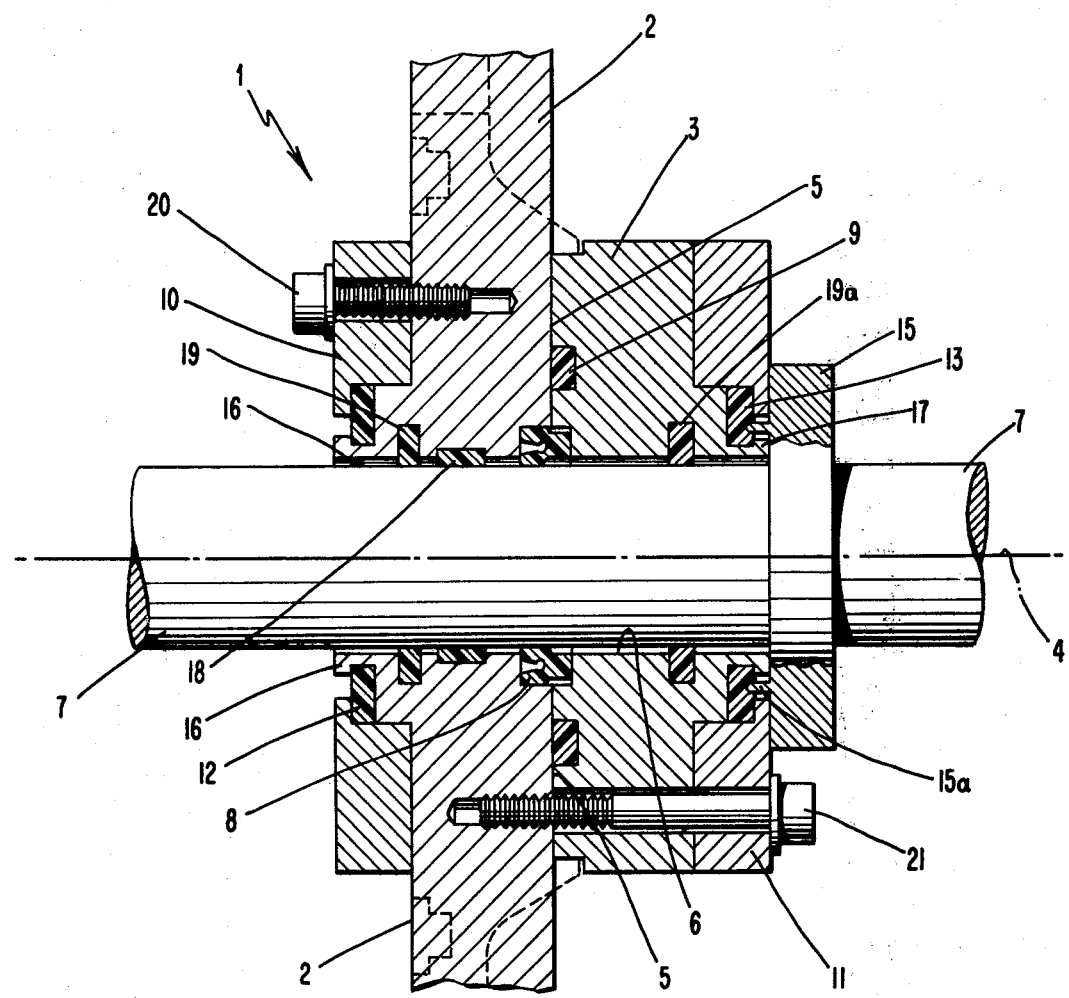

An example of the invention is illustrated in the drawings and explained in the following. In the drawings:

FIG. 1 shows a schematic view of a gastight penetration as used in an electrical switching device, an actuating rod with a first and a second rod-sealing flange being depicted in the open or off position, with the other parts of the penetration shown in axial section, FIG. 2 shows the same penetration as in FIG. 1, but with the actuating rod in the closed or on position, FIG. 3 is an assembly drawing of a preferred form shown in axial section with the actuating rod in the open position, FIG. 4 shows the assembly drawing of FIG. 3, but with the actuating rod in the closed position, and FIG. 5 is a detail of the penetration in FIGS. 3 and 4 with an additional rubbing strip.

In the schematic diagram of FIG. 1, the gastight penetration in its entirety is denoted 1. The sealing housing 2, which in FIG. 1 is represented by the wall 2 of the gas-filled enclosure of the switch, also encloses a gas-filled space 22. The number 3 indicates a sealing flange, and 4 the axis or axial direction of the actuating rod 7. The region of division 5 of the gastight penetration is a zone in the vicinity of the sealing housing 2, which in FIGS. 3 and 4 is also indicated partly by a broken line, and of the wall 2 of the gas-filled enclosure and also of the sealing flange 3. The gap between the sealing housing 2 or wall 2 and the sealing flange 3, on the one hand, and the actuating rod 7, on the other hand, is denoted 6. A sliding seal acting predominantly radially and sealing the gap 6 in the region of division 5 is denoted 8, and a flange seal acting predominantly axially and isolating the sliding seal 8 in the region of division 5 from the exterior space 23 surrounding the sealing housing 2 or wall 2 is denoted 9. With the switch in the open position as shown, a first impact seal 12 in the sealing housing or wall, and acting predominantly axially, is pressed against the sealing housing 2 or wall 2 in the axial direction 4 by a first rod-sealing flange 14, thus additionally sealing one end of the gap 6 in the region 16. With the switch in this position, the second impact seal 13 is separated from the second rod-sealing flange 15, and therefore this latter impact seal expands in the axial direction in the manner shown. With the switch at this position the structural configuration of the penetration is of particular advantage. Should one or both of the most severely stressed seals, i.e., the sliding seal 8 and the second impact seal 13, have to be changed during operation owing to unacceptably high gas losses occurring in the closed position, this replacement of the two seals can be undertaken in the switch position shown in FIG. 1, i.e., the open position, without the gas in gas-filled space 22, such as sulphur hexafluoride ($SF_6$) for example, having to be withdrawn. The seal(s) can be changed with the switch in the open position after uncoupling the switch operating mechanism (not shown) under atmospheric air conditions. There is no need to dismantle the switch column (also not shown) or to raise it from its mounting. After simple dismantling of the second rod-sealing flange 15 the sealing flange 3 can be removed together with the two seals 8 and 13, and this can be followed, if necessary, by replacement of the flange seal 9.

In the schematic diagram of FIG. 2, the parts corresponding to parts in FIG. 1 are identified as in FIG. 1. The actuating rod 7 is here shown in the closed position, and thus the other end of the gap 6 is additionally sealed in region 17 by the second rod-sealing flange 13 acting in conjunction with the second impact seal 13. It can also be seen from FIG. 2 that in the case of a switch which is normally closed for some 95% of its life, the first impact seal 12 is accordingly not stressed and therefore generally performs its function throughout the life of the switch. Should special circumstances make it necessary, however, this impact seal can also be replaced, though in this instance the gas in gas-filled space 22 must be withdrawn.

In the light of FIGS. 1 and 2 and the aforesaid it can be stated as another advantage of the invention that if the sliding seal 8 fails with the switch in the closed or open positions, the appropriate impact seal working in conjunction with its corresponding rod-sealing flange takes over the sealing function of the sliding seal 8, in which case the flange seal 9 can possibly also become effective, and thus failure of seal 8 does not lead to any interruption of service because both in the gap 6 and in the region of division 5 of the gastight penetration 1 an axially acting impact seal 12 or 13 and the axially acting flange seal 9 are always arranged in series with the radially active sliding seal 8.

The assembly drawing of a preferred configuration of the invention is shown in FIG. 3. Parts corresponding to those in FIGS. 1 and 2 are again identified in the same way. In FIG. 3 it is indicated that the gastight penetration of the invention can be used not only by being incorporated in the wall 2 of the gas-filled enclosure of a switch, for example, but can also be used as appropriate for other purposes; for this reason the sealing housing 2 is represented partly by broken lines. FIG. 3 also shows the detachable axial fixing for the first impact seal 12 by means of a first seal retainer 10 and screws 20. The actuating rod 7 is supported in the sliding guide or plain bearing 18, a rubbing strip 19 being provided which seals the gap 6 and protects the sliding seal 8 on the gas-space side of the sealing flange, in particular by preventing dust from the gas-filled space 22 from reaching the sliding seal 8. On the first rod-sealing flange 14 a first sealing profile 14a is provided whose profile in the open switch position exerts an additional pressure in the axial direction 4 on the first impact seal 12 by way of the e.g. ring-shaped openings between the first seal retainer 10 and the sealing housing 2, the rim action of this profile 14a ensuring in advantageous manner that one end of the gap 6 is securely sealed in region 16.

In FIG. 4 the individual parts are identified as in FIG. 3. In this figure can be seen the detachable axial fixing for the second impact seal 13 by means of a second seal retainer 11 and further screws 21; at the same time, this fixing also detachably fastens and axially retains the sealing flange 3, the sliding seal 8 and the flange seal 9 on the sealing housing 2. Located on the second rod-sealing flange 15 is a second sealing profile 15a which in the closed switch position presses with its rim in the axial direction 4 against the second impact seal 13 and the sealing flange 3 by way of the ring-shaped opening between the second seal retainer 11 and the sealing flange 3, and in this way securely seals the other end of the gap 6 in region 17. Furthermore, the sliding seal 8 with its double-lip profile fits in the sealing housing 2 in such a way that not only the gap 6 but also the region of division 5 and any gap occurring in this region is sealed independently of the flange seal 9, and hence the sliding seal 8 and the flange seal 9 are arranged in series.

In an alternative form of the invention, shown in detail in FIG. 5, a second rubbing strip 19a can be located in the sealing flange between the sliding seal 8 and the second impact seal 13, the purpose of this strip being to prevent the atmosphere from exterior space 23 from entering the gap 6, and hence to protect the sliding seal 8.

Since the reliability of an electrical switch, for example, in particular an $SF_6$ switch, depends largely on the extent to which it is gastight, the gastight penetration of the invention, according to extensive tests to date, is especially suitable for answering a long-standing need in connection with such switches.

What we claim is:

1. In a gastight penetration through a wall of a gas-filled enclosure of the type having an opening in said wall and an actuating rod extending through said opening and movable in an axial direction, the improvement comprising:
  (a) a pair of flanges secured on said actuating rod on opposite sides of said wall and spaced apart a distance greater than the thickness of said wall,
  (b) flange seal means secured on the interior and exterior of said wall in position to be engaged by said flanges upon axial movement thereof relative to said wall,
  (c) rod seal means in said wall for preventing leakage of gas through said opening around said rod, said rod seal means being positioned between said flange seal means, and said wall including a removable plate on the exterior side for retaining said rod seal means, whereby said rod seal means and said exterior flange seal means may be replaced without leakage of gas through said opening.

2. A gastight penetration according to claim 1 wherein said removable plate includes a seal retainer member, said plate being detachably secured to the wall by means of screws axially clamping the rod seal between said plate and said wall.

3. A gastight penetration according to claim 1 wherein said flange seal means on the interior of said wall includes a retainer ring coaxial with said actuating rod and a seal ring positioned for engagement by said interior flange upon axial displacement of said actuating rod.

4. A gastight penetration according to claim 1 wherein said rod flanges each are provided with projecting rings concentric with said actuating rod, and said flange seal means includes a seal element positioned to be engaged by said flange projection of the respective flanges, and includes shoulder means for restricting axial displacement of said rod flange in the direction of said wall, thereby protecting said seal ring.

5. A gastight penetration as claimed in claim 1 in which the rod seal is in the form of an essentially V-shaped double-lip seal acting predominantly in the radial direction.

6. A gastight penetration as claimed in claim 5 in which at least the double lips of the sliding seal are located in the sealing housing and arranged in series with the flange seal.

* * * * *